6482X
J. Beckwith,
Rotary Pump,
Patented Apr. 16, 1831.
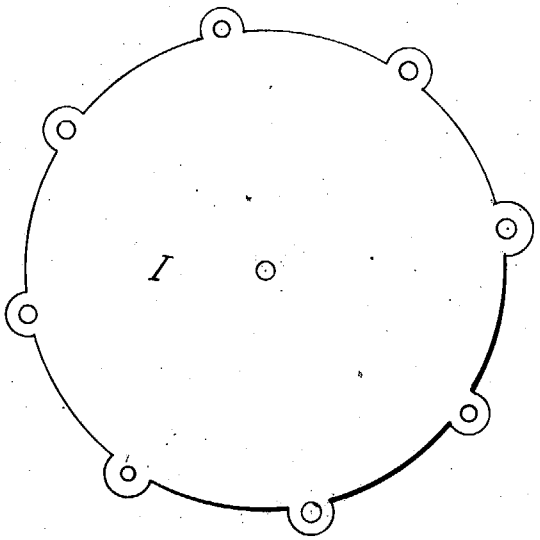
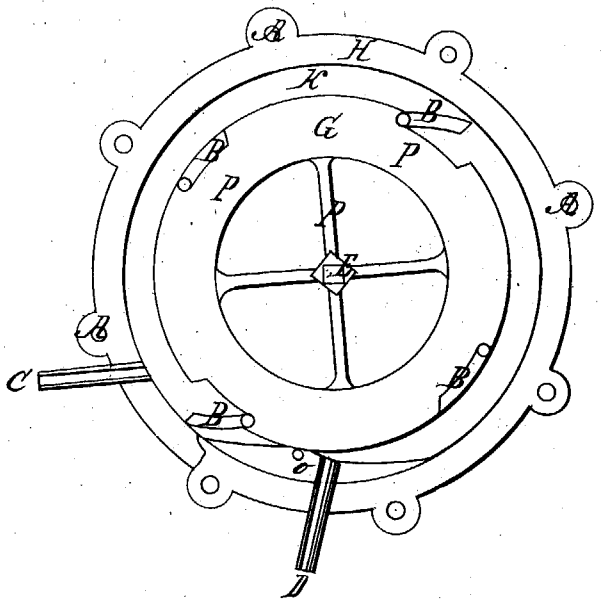
N. PETERS, PHOTO-LITHOGRAPHER, WASHINGTON, D. C.

Apl. 16. 1831

6482X Jedediah Beckwith
Letters Patent

89

The Schedule referred to in these Letters Patent and making part of the same, containing a description in the words of the said Jedediah Beckwith himself of his improvement in the Engine or pump for raising and ejecting water or air To all to whom these Presents shall come Be it known that I Jedediah Beckwith of the town and County of Saratoga and State of New York have invented a new and useful Engine or pump for raising and ejecting water or air denominated a suction and force engine for water or air and that the following is a full and exact description of the construction and operation of the said machine as invented by me. The machine is a flat water or air tight circular box of iron or other metal, or sufficient material of any required dimension or capacity made stationary and a valved wheel of like metal or material revolving within the box, by any power applied to a shaft or axle running through the outside plate and upon which the wheel is suspended with two holes through the rim of the box, one to admit the water or air into the machine and the other to discharge them. H. Represents the rim of a thickness and diameter suited to the desired capacity of the machine. I. The outside plates bolted to and enclosing the rim. G. The wheel revolving within the box. K. Space through which the water or air passes C. Suction hose entering the machine in a hole through the rim. D. Hole or spout to discharge the air or water B. Valves passing through the space open, except when closed at O. O. Friction roller on a projection in to close valves. P. Spiral or elastic springs to open valves. A. Openings for screw bolts to fasten the plates to the rim. E. Mortise for shaft. F. Arms for wheel.

Witnesses

R. M. Livingston
Thos. McGinniss

Jed^h Beckwith

Exd
W.F (340 W 1782)